United States Patent
Yamaoka et al.

(10) Patent No.: US 8,921,729 B2
(45) Date of Patent: Dec. 30, 2014

(54) WIRE ELECTRICAL DISCHARGE MACHINE CARRYING OUT ELECTRICAL DISCHARGE MACHINING BY INCLINING WIRE ELECTRODE

(71) Applicant: FANUC Corporation, Yamanashi (JP)

(72) Inventors: Masahide Yamaoka, Yamanashi (JP); Kaoru Hiraga, Yamanashi (JP)

(73) Assignee: FANUC Corporation, Yamanashi (JP)

( * ) Notice: Subject to any disclaimer, the term of this patent is extended or adjusted under 35 U.S.C. 154(b) by 50 days.

(21) Appl. No.: 13/671,983

(22) Filed: Nov. 8, 2012

(65) Prior Publication Data
US 2013/0186865 A1    Jul. 25, 2013

(30) Foreign Application Priority Data
Jan. 20, 2012 (JP) .................. 2012-010308

(51) Int. Cl.
B23H 7/06 (2006.01)
B23H 1/02 (2006.01)
B23H 1/04 (2006.01)
B23H 7/30 (2006.01)
B23H 7/20 (2006.01)

(52) U.S. Cl.
CPC .................. B23H 1/04 (2013.01); B23H 1/024 (2013.01); B23H 7/30 (2013.01); B23H 7/20 (2013.01); B23H 7/065 (2013.01)
USPC ..................................................... 219/69.12

(58) Field of Classification Search
CPC .......... B23H 1/024; B23H 1/04; B23H 7/065; B23H 7/30
USPC ........................................... 219/69.12, 69.13
See application file for complete search history.

(56) References Cited

U.S. PATENT DOCUMENTS

| 5,897,791 A | 4/1999 | Hayakawa |
| 7,465,898 B2 | 12/2008 | Kaneko |
| 2006/0102596 A1 | 5/2006 | Kinoshita et al. |

FOREIGN PATENT DOCUMENTS

| CN | 1155863 A | 7/1997 |
| CN | 102069244 A | 5/2011 |
| EP | 2272613 A2 | 1/2011 |
| JP | 6357120 A1 | 3/1988 |
| JP | 1264718 A | 10/1989 |
| JP | 6114632 A | 4/1994 |
| JP | 10-29117 A | * 2/1998 |
| JP | 10-328938 A | * 12/1998 |

(Continued)

OTHER PUBLICATIONS

Machine translation of Japan Patent document No. 10-29117, Feb. 2014.*

(Continued)

Primary Examiner — Geoffrey S Evans
(74) Attorney, Agent, or Firm — Lowe Hauptman & Ham, LLP

(57) ABSTRACT

A wire electrical discharge machine is capable of step machining by setting only a position located anterior to a step portion of the workpiece during a setup operation before machining, without setting an inclination finishing position of a wire electrode after passing the step portion. A machining program is read, and when a wire electrode reaches a preset inclination starting position in front of a step position, inclination control of the wire electrode is started. Then, when the wire electrode has passed the position of the step portion, the inclination control of the wire electrode is finished.

4 Claims, 5 Drawing Sheets

(56) References Cited

FOREIGN PATENT DOCUMENTS

| | | | |
|---|---|---|---|
| JP | 10-328938 | A | 12/1998 |
| JP | 2885228 | B2 | 4/1999 |
| JP | 11-221718 | A | 8/1999 |
| JP | 2003-136339 | A | 5/2003 |
| JP | 2007-144567 | A | 6/2007 |
| JP | 2007-290088 | A | 11/2007 |
| JP | 2008-62303 | A | 3/2008 |
| JP | 2011-16172 | A | 1/2011 |

OTHER PUBLICATIONS

Machine translation of Japan Patent document No. 10-328,938, Feb. 2014.*

Office Actiion with English translation dated Apr. 9, 2013 (6 pages).

Office Action mailed Feb. 10, 2014, corresponds to Chinese patent application No. 201310022010.0.

Extended European Search Report issued Jul. 2, 2014, corresponds to European patent application No. 12191918.7.

* cited by examiner

MACHINING DIRECTION →

WIRE ELECTRICAL DISCHARGE MACHINE CARRYING OUT ELECTRICAL DISCHARGE MACHINING BY INCLINING WIRE ELECTRODE

RELATED APPLICATIONS

The present application claims priority from Japanese Application No. 2012-010308 filed Jan. 20, 2012, the disclosure of which is hereby incorporated by reference herein in its entirety.

BACKGROUND OF THE INVENTION

1. Field of the Invention

The present invention relates to a wire electrical discharge machine, and more specifically to a wire electrical discharge machine carrying out electrical discharge machining by inclining a wire electrode.

2. Description of the Related Art

In a case of carrying out machining with a wire electrical discharge machine, in a machining (step machining) in a step portion where a plate thickness of a workpiece suddenly changes, a streak of incision tends to generate in the step portion. This is considered to be generated by a rapid change of a fulcrum of the oscillation of the wire electrode in the step portion.

In a case where there is a step shape in the workpiece in wire electrical discharge machining, it is an important problem to suppress generation of a streak of incision in the step portion. Among the shapes of workpieces to be machined by wire electrical discharge machining, there are those having a step, and thus various control techniques have been proposed to suppress generation of such a streak of incision in the step portion. Specifically, such proposed technique includes prevention of a rapid change of a fulcrum of oscillation by inclining a wire electrode in a section sandwiching a step portion, control of energy applied from a power source for machining by detecting a step portion during the electrical discharge machining, and control of machining conditions in response to a change in the plate thickness.

A streak of incision generated in a step portion is described using FIG. 7.

In a case of machining a workpiece having a step portion where a plate thickness changes rapidly, a streak of incision is generated as shown by a reference numeral 51 in a plate thickness changing portion on a machining surface, while it is possible to suppress a streak of incision by inclining a wire electrode 4 when machining the step portion.

For example, in a first example disclosed in Japanese Patent Application Laid-Open No. 10-328938, whether or not a wire electrode is positioned in a section sandwiching a step portion is determined by setting the section sandwiching the step portion of a workpiece and an amount of inclination of the wire electrode. Then, in a case of determining that the wire electrode is positioned in the section sandwiching the step portion of the workpiece, the wire electrode is inclined at a predetermined angle to the workpiece based on the amount of inclination thus set to carry out electrical discharge machining. Then, the wire electrode is gradually returned from a position passing the step portion to the original state.

In the above technique, the section sandwiching the step portion is preset before machining, and in a case of determining that the wire electrode is positioned in the section sandwiching the step portion, the step portion is machined by inclining the wire electrode. Therefore, regardless of the number of machining, it is possible to machine by inclining the wire electrode to the step portion. However, since the section sandwiching the step portion has to be preset before machining, it turns out to take a larger number of steps for a setup.

In addition, in a second example disclosed in Japanese Patent Application Laid-Open No. 10-328938 above, by setting the amount of inclination of the wire electrode, the position of the step portion in the workpiece is detected from the state of machining the workpiece. Then, after detecting the position of the step portion, whether or not the wire electrode is positioned in the section sandwiching the step portion is determined, and in a case of determining that the wire electrode is positioned in the section sandwiching the step portion of the workpiece, the wire electrode is inclined at a predetermined angle based on the amount of inclination thus set to carry out electrical discharge machining, and the wire electrode is gradually returned from a position passing the step portion to the original state.

Since the above technique cannot incline the wire electrode in the step of detecting the step portion, it is assumed that the fulcrum of oscillation of the wire electrode rapidly changes when machining the step portion so that a streak of incision generates in the step portion.

Japanese Patent Application Laid-Open No. 2008-62303 discloses a control method to reduce the oscillation of the wire electrode for improvement of linearity of the machining surface of the workpiece and also to suppress the generation of a streak of incision in the step portion where the thickness of the workpiece rapidly changes. In this control method, when the state of electrical discharge in a machining gap is detected and electrical discharge does not occur in the machining gap even after a period of time defined in advance, it is determined that the machining gap is short circuited and thus the time to apply a pulse voltage for machining to the machining gap is shortened. This technique focuses on problems same as the present invention does, while it is different from the present invention which carries out control of machining the step portion by inclining the wire electrode, as described below, in that it controls the pulse voltage for machining to reduce the oscillation of the wire electrode.

Japanese Patent Application Laid-Open No. 2003-136339 discloses a technique that classifies modes of spraying a machining fluid from a machining fluid spray nozzle to a working gap into a plurality of types as differences in spraying conditions, and then, carries out machining by switching, for each spraying conditions thus classified, to a different plate thickness of an object to be machined and a set machining condition adapted to the machining of the plate thickness. However, this technique is different from the present invention in that a plate thickness of the object to be machined is determined from the mode of spraying of the machining fluid during electrical discharge machining to alter the machining conditions to those adapted to the plate thickness, which does not intend to carry out control for alteration of the machining conditions.

Japanese Patent Application Laid-Open No. 2011-16172 discloses a technique that detects a change of a plate thickness of a workpiece and controls energy applied from a power source for machining to decrease temporarily at a place where the plate thickness changes. It should be noted that, while this prior art technique focuses on the same problems as that of the present invention, the object of the prior art technique is to control the energy, not controlling an inclination angle of a wire electrode in a step portion of a workpiece, thus the present invention is different from the prior art technique in this respect.

Japanese Patent Application Laid-Open No. 2007-144567 discloses a technique that detects a change of a plate thickness of a workpiece in a rough machining step to store the plate thickness in association with a step position, and then, in a finish machining step after finishing the rough machining step, alters the machining conditions to machining conditions suitable for the plate thickness thus detected when a machining area reaches a region around the step position for machining with a constant electrical discharge gap. It should be noted that this technique stores a change in the plate thickness of the workpiece in rough machining step to alter the settings to machining conditions adapted to the change in the plate thickness in finish machining step, which is different from the present invention that carries out control of inclining the wire electrode in a step portion.

Japanese Patent Application Laid-Open No. 11-221718 discloses a technique that detects a change in the plate thickness of the workpiece and adjusts a length of a machining suspension time to suspend application of a voltage to a gap between the wire electrode and the workpiece using a plate thickness change rate, a pulse current peak value, a pulse width of the pulse current, and a set voltage and a feedback gain in servo feed control in which a feed back control is performed so that an average machining voltage in the gap between the wire electrode and the workpiece agrees with a set voltage, thereby regulating the energy applied from an electrical discharge current generator. However, this technique adjusts the energy applied from the electrical discharge current generator, such as electrical discharge suspension time and pulse current peak value, which is different from the present invention that controls the wire electrode so that it inclines a predetermined angle.

Japanese Patent Application Laid-Open No. 2007-290088 discloses a technique that calculates a plate thickness at a machining path in a workpiece based on numerical control data and three-dimensional data to define control details using the plate thickness. However, this technique calculates the plate thickness at the machining path in the workpiece from the three-dimensional data to feedback-control the energy of the voltage using control data corresponding to the plate thickness thus calculated, which does not incline the wire electrode at a predetermined angle, so that it is different from the present invention.

SUMMARY OF THE INVENTION

With that, in view of the above problems in those prior art techniques, it is an object of the present invention to provide a wire electrical discharge machine capable of step machining by setting only a front position of a step portion during a setup operation before machining without setting an inclination finishing position of a wire electrode after passing the step portion.

The wire electrical discharge machine according to the present invention has a workpiece plate thickness change detection part configured to detect a change of a plate thickness in a step portion of a workpiece based on energy applied from a power source unit for machining, and machines the workpiece by relatively moving a wire electrode with respect to the workpiece with electrical discharge generated, from the power source unit for machining, between the wire electrode and the workpiece. The wire electrical discharge machine comprising: a setting part configured to set a wire electrode inclination starting position located anterior to a step portion; a wire electrode inclination starting position passing judgment part configured to determine whether or not the wire electrode passes the wire electrode inclination starting position set by the setting part; a wire electrode inclination control part configured to carry out control of inclining the wire electrode within the machining plane with respect to a side where the machining plane, formed by relative movement of the wire electrode with respect to the workpiece, crosses the surface of the step portion of the workpiece when the wire electrode inclination starting position passing judgment part determined that the wire electrode has passed the wire electrode inclination starting position; a step passing determination part configured to determine that the wire electrode has passed a position of the step portion when the plate thickness change detected by the workpiece plate thickness change detection part exceeds a preset value; and a wire electrode inclination finishing control part configured to finish the control of inclining the wire electrode when the step passing determination part determines that the wire electrode has passed the position of the step portion.

The energy applied from the power source unit for machining may be a number of pulses of a pulse current applied from the power source unit for machining or a value of integral of the pulse current.

The workpiece plate thickness change detection part may obtain energy applied from the power source unit for machining when the wire electrode moves in a predetermined distance after passing the wire electrode inclination starting position and detects a change in the plate thickness of the workpiece by comparing the energy thus obtained with a predetermined reference energy.

The present invention enables to provide a wire electrical discharge machine capable of step machining by setting only a front position of a step portion during a setup operation before machining without setting an inclination finishing position of a wire electrode after passing the step portion.

BRIEF DESCRIPTION OF THE DRAWINGS

The above and other objects and features of the present invention will be apparent from the following description of embodiments with reference to the attached drawings. Among the drawings.

DETAILED DESCRIPTION OF THE PREFERRED EMBODIMENTS

The present invention improves a method of setting a step section when machining a workpiece by inclining a wire electrode in a step portion to shorten a setup time of step machining, as compared with prior art techniques. Therefore, a position located anterior to a step portion of a workpiece is set in advance using a program or the like, and a wire electrical discharge machine of the present invention carries out machining on the workpiece by inclining a wire electrode from the position thus set. Then, it controls to finish inclination of the wire electrode from a position where the step portion is detected.

A wire electrical discharge machine of the present invention:
(1) sets only a position located anterior to a step portion of a workpiece by means such as a program;
(2) sets an amount of inclination of a wire electrode by means such as a program;
(3) determines whether or not the wire electrode is in a position located anterior to a step portion of a workpiece;
(4) carries out electrical discharge machining by inclining the wire electrode at a predetermined angle based on the amount of inclination set in (2) above when determined that the wire electrode is in a position located anterior to a step portion of a workpiece; and
(5) detects a position of the step portion from a state of machining of the workpiece while machining the workpiece by inclining the wire electrode, and finishes the inclination of the wire electrode so as to return the wire electrode to the state before inclination from a point of time when the position of the step portion is determined.

Figure 1:
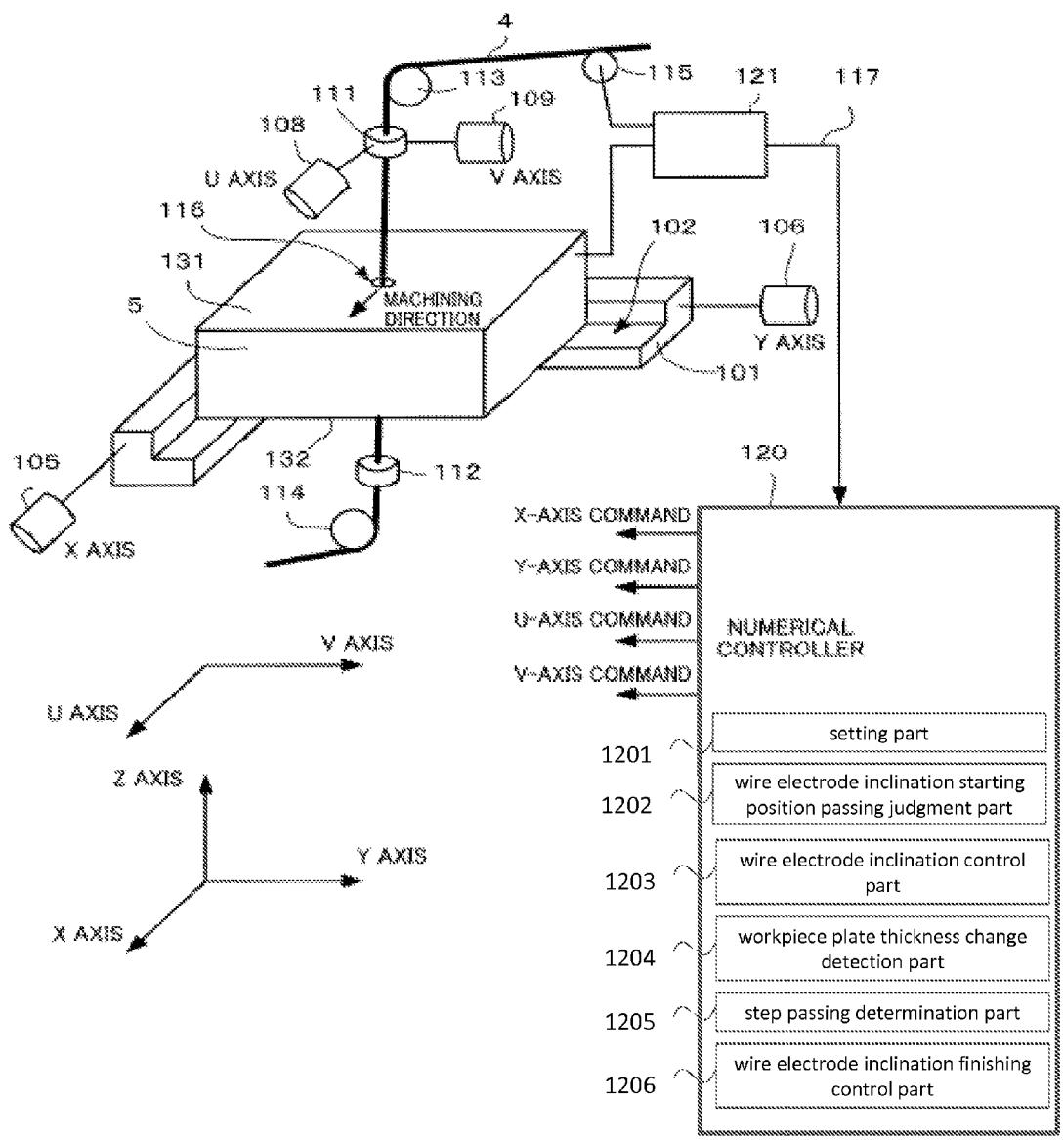
FIG. 1 is a diagram illustrating a schematic configuration of a wire electrical discharge machine to which the present invention is applicable.
Figure 2:
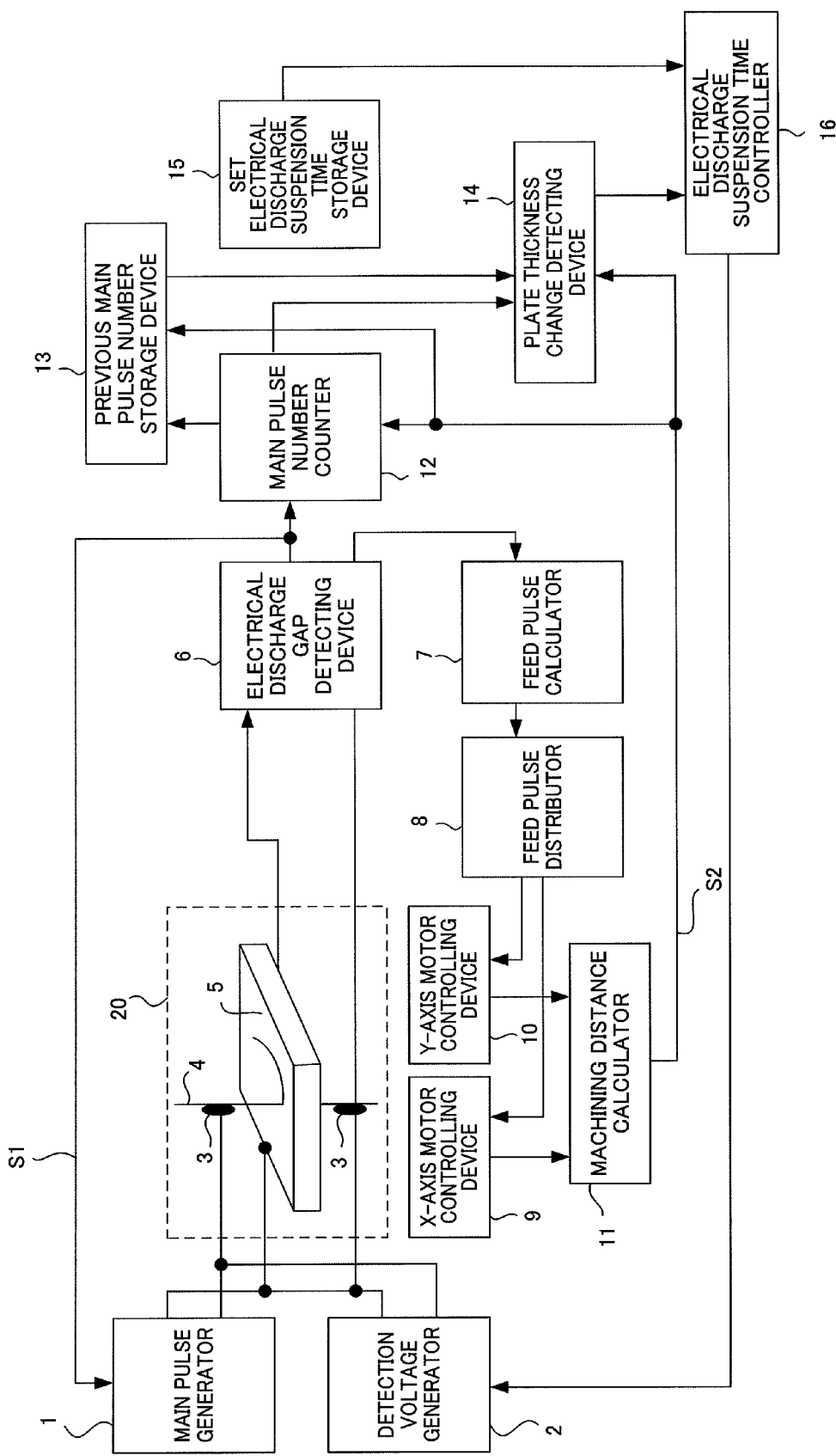
FIG. 2 is a block diagram illustrating a numerical controller of the wire electrical discharge machine of the present invention carrying out electrical discharge machining by inclining a wire electrode.

A description is given to a wire electrical discharge machine according to the present invention using FIGS. 1 and 2.

FIG. 1 is a diagram illustrating a schematic configuration of a wire electrical discharge machine to which the present invention is applicable, which is in common with a schematic configuration of a conventional wire electrical discharge machine.

A workpiece 5 as an object to be machined is mounted on a workpiece table 101 and fixed thereto. This workpiece table 101 has a placement surface 102 of high precision flatness. The workpiece 5 is installed on the workpiece table 101 and fixed thereto during wire electrical discharge machining so that the bottom of the workpiece makes contact with the placement surface 102.

In order to carry out electrical discharge machining on the workpiece 5, the wire electrode 4 is supplied from a wire electrode delivery reel (not shown) through a feed roller 115, an upper guide roller 113, and an upper wire guide 111 to a machining spot 116. During wire electrical discharge machining, the wire electrode 4 is stretched between the upper wire guide 111 and a lower wire guide 112 by a wire connection operation, and a voltage is applied to generate electrical discharge between the wire electrode 4 and the workpiece 5. The wire electrode 4 is wound up by a take-up reel (not shown) that pulls the wire electrode 4 at a predetermined tension through the machining spot 116, and further through the lower wire guide 112 and a lower guide roller 114. Instead of winding up the wire electrode with the take-up reel, it may also be collected in a wire collection box (not shown). To the wire electrode 4, electrical energy for electrical discharge machining is supplied via the feed roller 115 from a power source unit 121 for machining. A number of pulses of a pulse current or a value of integral of a pulse current applied from the power source unit 121 for machining can be dealt as an amount of energy. In addition, in the machining spot 116, an approach, such as pouring cooling water or immersing the entire workpiece 5 in a machining fluid (for example, pure water), is employed.

The placement surface 102 of the workpiece table 101 is usually laid on a horizontal surface (surface parallel to an XY plane). The workpiece table 101 is driven by servomotors 105 and 106 of an X-axis and a Y-axis on a surface parallel to the XY plane defined by the orthogonal axes of the X-axis and the Y-axis. In addition, the upper wire guide 111 is driven by servomotors 108 and 109 of a U-axis and a V-axis on a surface parallel to the XY plane. Usually, a direction of movement by the U-axis and a direction of movement by the X-axis are parallel, and a direction of movement by the V-axis and a direction of movement by the Y-axis are parallel.

In order to move the machining spot 116 to a certain direction, relative position of the workpiece 5 with respect to the wire electrode 4 is changed. The alteration of the relative positions of the wire electrode 4 is carried out by a command to the servomotor of each axis (X-axis command, Y-axis command, U-axis command, V-axis command) outputted from a numerical controller 120. The contents of such commands are usually prescribed in a machining program. The machining program is a program which prescribes movement commands of the wire electrode 4, that is, movement commands to the servomotor of each axis, and is defined for a plane parallel to the XY plane described above. This plane thus defined can be set at any position in a Z-axis direction. This XY plane to be set at any Z-axis position is referred to as a program surface. As illustrated in FIG. 1, the numerical controller 120 includes a setting part 1201, a wire electrode inclination starting position passing judgment part 1202, a wire electrode inclination control part 1203, a workpiece plate thickness change detection part 1204, a step passing determination part 1205, and a wire electrode inclination finishing control part 1206, which will be described herein below.

A numerical controller of a wire electrical discharge machine that carries out electrical discharge machining by inclining a wire electrode is described using a block diagram in FIG. 2.

The numerical controller in FIG. 2 can be described in the form of a functional block diagram of the numerical controller 120 illustrated in FIG. 1. A main pulse generator 1 applies a pulsed voltage (main pulse voltage V1) to a gap (machining gap) between the wire electrode 4 and the workpiece 5 in order to carry out electrical discharge machining. This main pulse generator 1 is configured with a circuit including switching devices, such as a direct current power supply and a transistor, a charge and discharge circuit of a capacitor, and the like.

A detection voltage generator 2 applies a detection pulse voltage V2 (voltage lower than the main pulse voltage from the main pulse generator 1) to the machining gap in order to detect whether or not the gap (machining gap) between the wire electrode 4 and the workpiece 5 is capable of electrical discharge. The detection voltage generator 2 is configured with a circuit including an active device, such as a transistor, a resistor, and a capacitor, a direct current power supply, and the like.

Conductive brushes 3 are members to energize the wire electrode 4. The conductive brushes 3 are connected to one terminal of the main pulse generator 1 and one terminal of the detection voltage generator 2, respectively. In addition, the other terminal of the main pulse generator 1 and the other terminal of the detection voltage generator 2 are connected respectively to the workpiece 5. Due to this configuration, to the gap (machining gap) between the travelling wire electrode 4 and the workpiece 5, the main pulse voltage V1 generated from the main pulse generator 1 and the detection pulse voltage V2 generated from the detection voltage generator 2 are applied.

An electrical discharge gap detecting device 6 is electrically connected respectively to the workpiece 5 and the wire electrode 4, and determines whether or not the gap (machining gap) between the wire electrode 4 and the workpiece 5 is in a state capable of electrical discharge by a voltage drop of the detection pulse voltage V2. This electrical discharge gap detecting device 6 determines as capable of electrical discharge when detecting a voltage drop of the detection pulse voltage V2, and sends a main pulse input signal S1 to the main pulse generator 1.

As the main pulse generator 1 receives the main pulse input signal S1, it generates the main pulse voltage V1 and applies a main pulse current (electrical discharge machining current) having a predetermined width to the gap (machining gap) between the wire electrode 4 and the workpiece 5. In addition, the main pulse input signal S1 outputted from the electrical discharge gap detecting device 6 is inputted to a main pulse number counter 12 where the number of main pulses is counted. Further, the electrical discharge gap detecting device 6 outputs a signal for servo feed to a feed pulse calculator 7.

The feed pulse calculator 7 generates a pulse train having a feed pulse interval controlled to optimize repeat of electrical discharge (usually, to make a voltage in the machining gap to be constant) based on the signal for servo feed from the electrical discharge gap detecting device 6 and outputs it to a feed pulse distributor 8. The feed pulse distributor 8 distributes this pulse train thus received to driving pulses of the X-axis and the Y-axis based on the machining program and outputs them respectively to an X-axis motor controlling device 9 and a Y-axis motor controlling device 10 that drive a table having the workpiece 5 placed thereon.

A machining distance calculator 11 is connected to the X-axis motor controlling device 9 and the Y-axis motor controlling device 10, and a relative movement distance of the wire electrode 4 with respect to the workpiece 5 is obtained from positional feedback signals from position detectors (not shown) mounted respectively to an X-axis driving motor (not shown) and a Y-axis driving motor (not shown), and a predetermined distance detection signal S2 is outputted to the main pulse number counter 12, a previous main pulse number storage device 13, and a plate thickness change detecting device 14 (i.e., the workpiece plate thickness change detection part 1204 described in FIG. 1) every time the relative movement distance reaches a set value (predetermined machining distance) (that is to say, every time the wire electrode 4 moves forward to the workpiece 5 in a predetermined distance).

In the present invention, whether or not the wire electrode 4 has reached the position PA located anterior to a step portion of the workpiece 5 depends on a comparison of the value of the position PA located anterior to a step portion with the values of position of the wire electrode 4 in X-axis and Y-axis directions of the wire electrode 4 obtained based on the positional feedback signal from the position detectors (not shown) mounted respectively to the X-axis driving motor (not shown) and the Y-axis driving motor (not shown). That is to say, with a result of this position comparison, it is possible to determine whether the wire electrode 4 has passed a wire electrode inclination starting position or not.

Based on the signal (predetermined distance detection signal S2) from the machining distance calculator 11, the main pulse number counter 12 counts the main pulse input signal S1 inputted from the electrical discharge gap detecting device 6 while the electrical discharge machining moves forward in a predetermined distance. Since the main pulse generator 1 outputs a main pulse on the basis of the main pulse input signal S1 from the electrical discharge gap detecting device 6, counting a main pulse input signal S1 by the main pulse number counter 12 means counting a number of main pulses by the main pulse number counter 12. The main pulse number counter 12 outputs the value of main pulses thus counted to the previous main pulse number storage device 13 and the plate thickness change detecting device 14, respectively, in accordance with the signal from the machining distance calculator 11.

The previous main pulse number storage device 13 temporarily stores a counted value of main pulses to detect a step portion. The previous main pulse number storage device 13 inputs the counted value of the main pulse at this time from the main pulse number counter 12 to store it in accordance with the signal from the machining distance calculator 11 and also delivers the previously stored counted value of the main pulse number to the plate thickness change detecting device 14. The plate thickness change detecting device 14 detects a change in the plate thickness from the counted value of the previous main pulse number received from the previous main pulse number storage device 13 and the counted value of the current main pulse number received from the main pulse number counter 12.

In the present invention, a position PB of the step portion of the workpiece 5 is detected from a change in the plate thickness, based on the energy (numbers of pulses) stored in the machining distance calculator 11 which calculates a relative movement of the wire electrode 4 with respect to the workpiece 5 for each predetermined distance, the main pulse number counter 12 which obtains energy (number of pulses) applied from the power source unit for machining during electrical discharge machining of the workpiece 5 over the predetermined distance, and the previous main pulse number storage device 13.

A set electrical discharge suspension time storage device 15 stores data of an electrical discharge suspension time. The set electrical discharge suspension time storage device 15 outputs data of a set electrical discharge suspension time to an electrical discharge suspension time controller 16. The electrical discharge suspension time controller 16 controls the electrical discharge suspension time based on information of the change in the plate thickness received from the plate thickness change detecting device 14 and the set electrical discharge suspension time stored in the set electrical discharge suspension time storage device 15.

Figure 3:
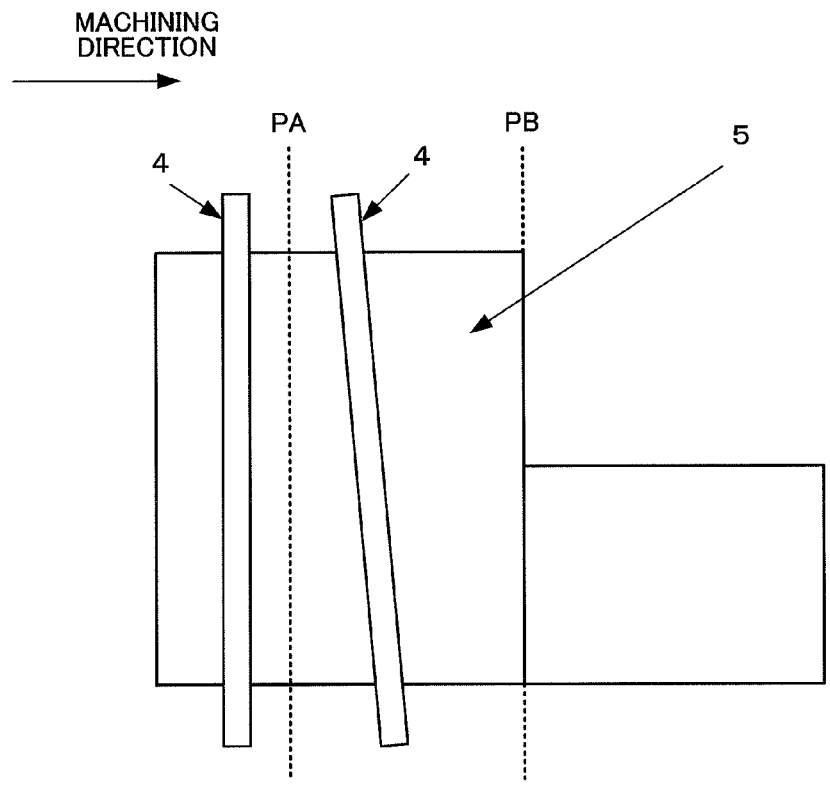
FIG. 3 is a diagram illustrating an operation for carrying out machining from a thick portion to a thin portion of a workpiece by controlling the wire electrical discharge machine illustrated in FIG. 1 by means of the numerical controller illustrated in FIG. 2.

An operation for carrying out machining from a thick portion to a thin portion of the workpiece 5 by controlling the wire electrical discharge machine illustrated in FIG. 1 by means of the numerical controller illustrated in FIG. 2 is described using FIG. 3.

The position PA located anterior to a step portion of the workpiece 5 is set by a program, a manual input, or the like. Then, when determined that the wire electrode 4 has passed the position PA located anterior to the step portion, the wire electrode 4 is inclined to a specified inclination angle DEG1. Here, inclination of the wire electrode 4 means inclination within a plane (machining plane) formed by relative movement of the wire electrode 4 with respect to the workpiece 5, and inclination direction of the wire electrode means a direction of the wire electrode which inclines with respect to a side where the machining plane crosses the surface of the step portion of the workpiece 5.

Inclination of the a wire electrode within the machining plane is carried out by inclination control which moves the upper wire guide 111 forward from the lower wire guide 112 in a machining direction or, on the contrary, inclination control which moves the lower wire guide 112 forward from the upper wire guide 111 in a machining direction. These inclination controls are carried out by driving the U-axis servomotor 108 and the V-axis servomotor 109.

Figure 4:
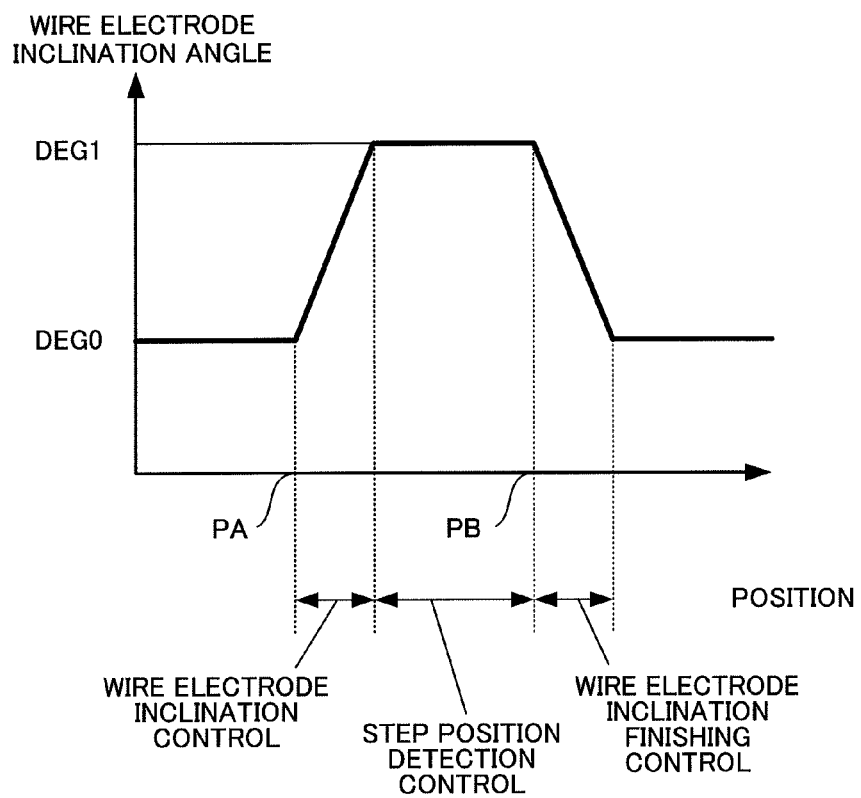
FIG. 4 is a diagram illustrating an inclination angle of the wire electrode which passed a position PA located anterior to a step portion of the workpiece and an inclination angle of a wire electrode 4 at a location where a plate thickness of a workpiece 5 changes.

Here, an inclination angle of the wire electrode which passed the position PA located anterior to a step portion of the workpiece and an inclination angle of the wire electrode 4 at a location where a plate thickness of the workpiece 5 changes are described using FIG. 4.

After passing the position PA located anterior to a step portion, the wire electrode 4 inclines to the specified inclination angle DEG1 from an inclination angle DEG0 of the wire electrode during standard straight machining before reaching the position PB of the step portion by wire electrode inclination angle control. The inclination of the wire electrode 4 is carried out, for example, gradually. After inclining to the specified inclination angle DEG1, the wire electrode 4 carries out electrical discharge machining while maintaining the specified inclination angle DEG1 until the plate thickness change detecting device 14 detects the position PB of the step portion. When determined that the wire electrode 4 has passed the position PB of the step portion, inclination of the wire electrode 4 is finished and the inclination angle of the wire electrode 4 is returned to the original state (inclination angle DEG0 of the wire electrode during standard straight machining). Here, the specified inclination angle DEG1 of the wire electrode 4 may be a positive value or may also be a negative value. In addition, as means for detecting the position PB of the step portion, a water pressure of a machining fluid supplied from a machining fluid spray outlet attached to upper and lower arms for fixing the upper and lower wire guides 111 and 112 or three dimensional CAD data of the workpiece 5 may also be used.

Figure 5:
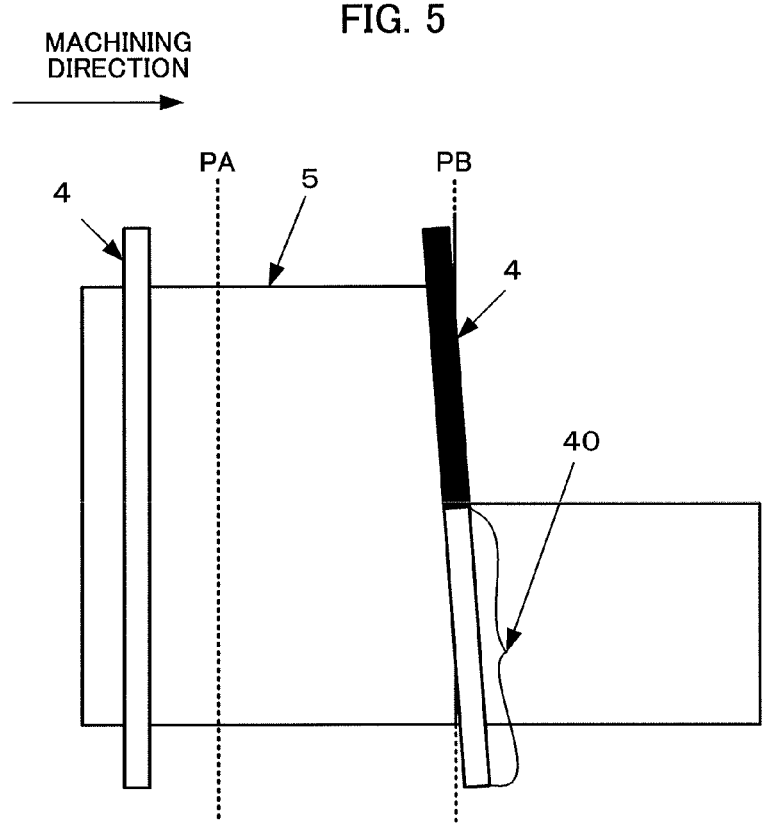
FIG. 5 is a diagram illustrating a state of the wire electrode when detecting a position of the step portion with a plate thickness change detecting device in the numerical controller.
Figure 7:
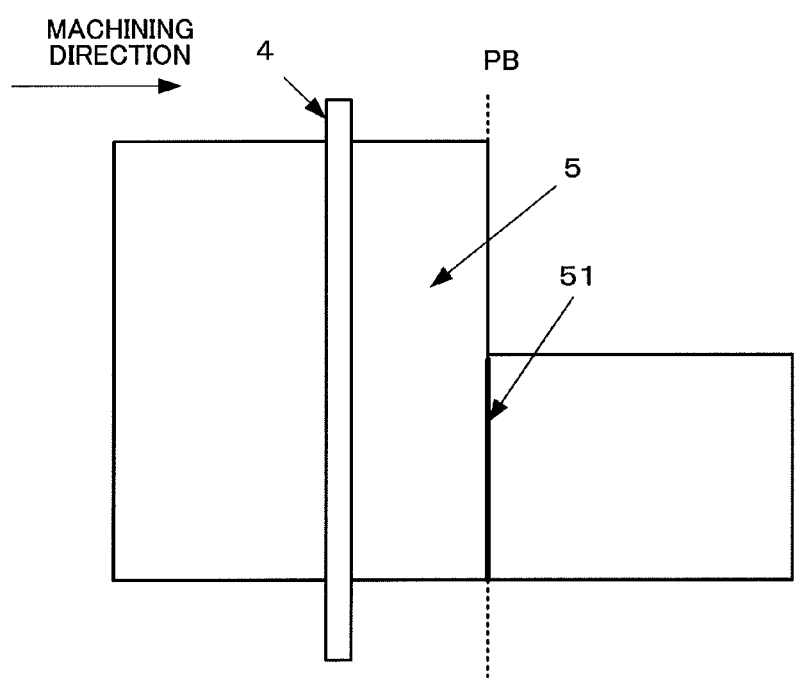
FIG. 7 is a diagram illustrating a streak generated at a location changing a plate thickness of a workpiece.

A state of the wire electrode 4 when detecting the position PB of the step portion with the plate thickness change detecting device 14 in the numerical controller illustrated in FIG. 2 is described using FIG. 5.

When detecting the position PB of the step portion in the workpiece 5 with the plate thickness change detecting device 14, a part (refer to a reference numeral 40 in FIG. 5) of the wire electrode 4 passes the position PB of the step portion, as illustrated in FIG. 5. In addition, when the wire electrode 4 passes the position PB of the step portion, the inclination of the wire electrode 4 is returned to the original state.

As the wire electrode 4 reaches the position PB of the step portion, a length of the wire electrode 4 that is engaged in electrical discharge machining of the workpiece 5 starts decreasing, and after the wire electrode 4 has passed the position PB of the step portion, the length of the wire electrode 4 that is engaged in electrical discharge machining of the workpiece 5 does not decrease any more and becomes constant. The change in the length of the wire electrode 4 that is engaged in machining of the workpiece corresponds to a change in the plate thickness of the workpiece 5 detected by the plate thickness change detecting device 14. Alternatively, by presetting a reference energy amount, it is possible to determine that the wire electrode 4 reaches the position PB of the step portion of the workpiece 5 when the energy (a number of pulses of the pulse current or a value of integral of the pulse current) applied from the power source unit 121 for machining reaches the reference energy amount thus set.

As illustrated in FIG. 3, when it is detected that the wire electrode 4 reaches the position PA located anterior to a step portion of the workpiece, the U-axis and V-axis servomotors 108 and 109 are controlled based on a preset amount of inclination of the wire electrode. Then, as illustrated in FIG. 5, as soon as the wire electrode 4 has passed the position PB of the step portion, control of returning the inclined wire electrode 4 to an original position is carried out (wire electrode inclination finishing control).

Figure 6:
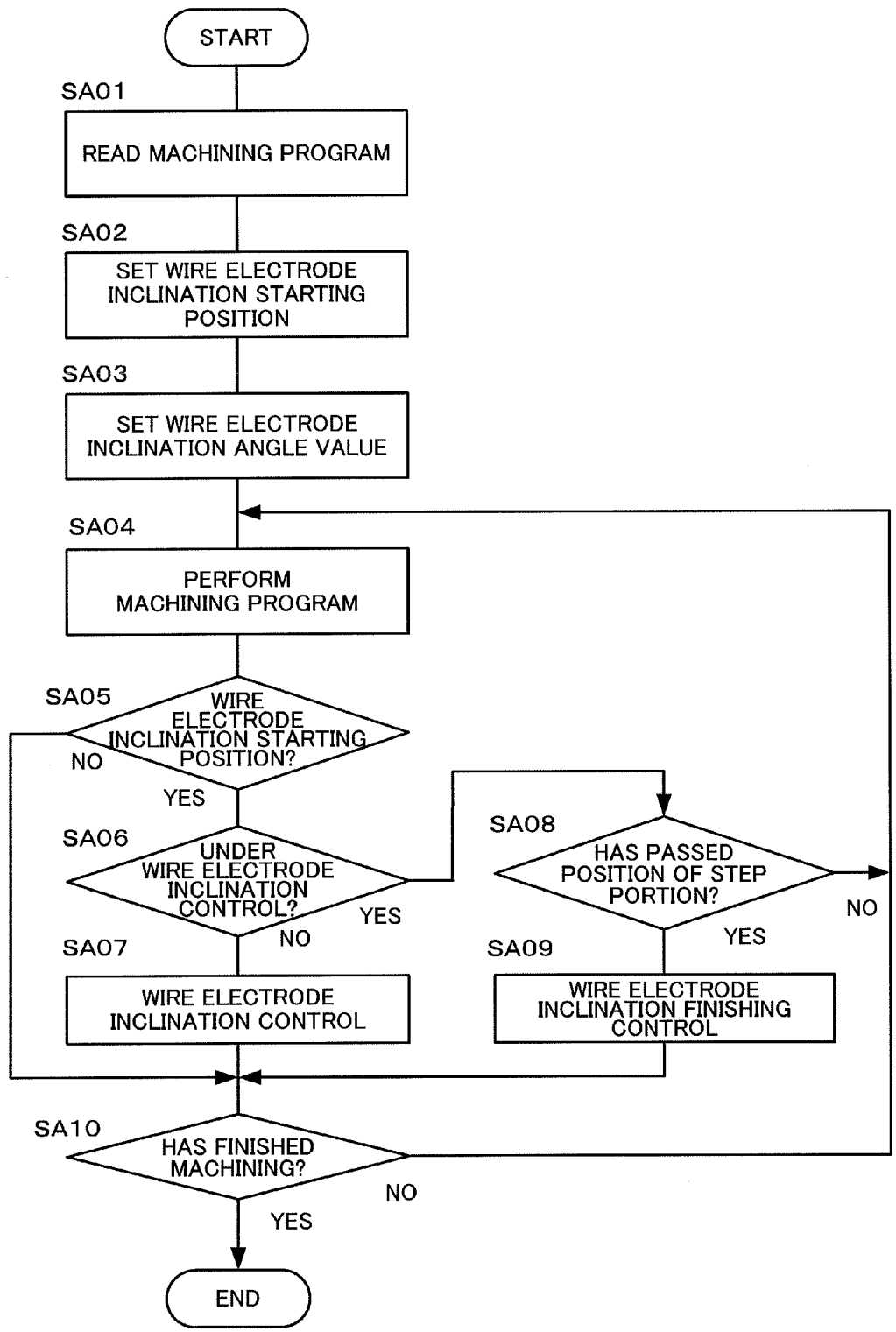
FIG. 6 is a flowchart showing inclination control of the wire electrode performed by the wire electrical discharge machine according to the present invention.

The inclination control of a wire electrode performed by a wire electrical discharge machine according to the present invention is described using a flowchart in FIG. 6 which shows an algorithm performed by the numerical controller 120. The description is given below following each step. The inclination control and the inclination finishing control of the wire electrode 4 can be carried out by adding movement control of the U-axis and the V-axis to movement control of the X-axis and the Y-axis.

[Step SA01] A machining program is read.
[Step SA02] An inclination starting position of the wire electrode is set. That is, a position located anterior to a step portion of the workpiece is set.
[Step SA03] A wire electrode inclination angle value is set.
[Step SA04] The machining program is performed.
[Step SA05] Whether or not the wire electrode reaches the inclination starting position set in step SA02 is determined, and if determined that the wire electrode reaches the inclination starting position, then process proceeds to step SA06, but if determined that the wire electrode has not reached the inclination starting position yet, then process proceeds to step SA10.
[Step SA06] Whether or not the wire electrical discharge machine is under wire electrode inclination control, and if determined that the wire electrical discharge machine is under wire electrode inclination control, then process proceeds to step SA08, but if determined that the wire electrical discharge machine is not under wire electrode inclination control, then process proceeds to step SA07.
[Step SA07] Wire electrode inclination control is performed.
[Step SA08] Whether or not the wire electrode has passed the position of the step portion is determined, and if determined that the wire electrode has passed the position of the step portion, then process proceeds to step SA09, but if determined that the wire electrode has not passed the position of the step portion yet, then processing returns to step SA04, and this processing is continued.
[Step SA09] Wire electrode inclination finishing control is performed.
[Step SA10] Whether or not machining is finished is determined, and if determined that machining has not finished yet, then process proceeds to step SA04, but if determined that machining has finished, then this processing is finished.

The wire electrical discharge machine according to the present invention includes: a setting part configured to set a wire electrode inclination starting position located anterior to a step portion; a wire electrode inclination starting position passing judgment part configured to determine whether or not the wire electrode passes the wire electrode inclination starting position in a workpiece; a wire electrode inclination control part configured to carry out control of inclining the wire electrode within the machining plane with respect to a side where the machining plane, formed by relative movement of the wire electrode with respect to the workpiece, crosses the surface of the step portion of the workpiece when the wire electrode inclination starting position passing judgment part determined that the wire electrode has passed the wire electrode inclination starting position; a step passing determination part configured to determine that the wire electrode has passed a position of the step portion when the plate thickness change detected by the workpiece plate thickness change detection device (i.e., the workpiece plate thickness change detection part) exceeds a preset value; and a wire electrode inclination finishing control part configured to carry out control of finishing the inclination of the wire electrode when the step passing determination part determines that the wire electrode has passed the position of the step portion.

In the flowchart of the algorithm described in FIG. 6, the process in step SA02 is carried out by the setting part 1201, the process in step SA05 is carried out by the wire electrode inclination starting position passing judgment part 1202, the process in step SA07 is carried out by the wire electrode inclination control part 1203, the process in step SA08 is carried out by the step passing determination part 1205 when the change of the plate thickness detected by the workpiece plate thickness change detection part 1204 exceeds a preset value, and the process in step SA09 is carried out by the wire electrode inclination finishing control part 1206. The setting part 1201, wire electrode inclination starting position passing judgment part 1202, wire electrode inclination control part 1203, workpiece plate thickness change detection part 1204, step passing determination part 1205, and wire electrode inclination finishing control part 1206 are implemented by the numerical controller 120 as described herein.

The value of the wire electrode inclination starting position (step portion front position) in step SA02 can be set by storing a value described in the machining program or a value inputted via an input/output device of the numerical controller 120 in a storage mechanism in the numerical controller 120. Similarly, the value of the wire electrode inclination starting position (step portion front position) in step SA03 can be set by storing a value described in the machining program or a value inputted via the input/output device of the numerical controller 120 in the storage mechanism in the numerical controller 120.

As the present invention only requires to set an inclination starting position of the wire electrode at a position located anterior to a step portion of the workpiece, setting of a section where the wire electrode is to be inclined is more convenient than in the case of prior art techniques. Accordingly, the position where inclination of the wire electrode is to be finished is not set, as a result, setup time for step machining is reduced in the case of the present invention. Then, the present invention allows to can carry out electrical discharge machining by inclining a wire electrode in a section including the step portion of the workpiece regardless of the number of machining, and thus the wire electrode passes the step portion of the workpiece under a continuous change in a state of machining, thereby avoiding a rapid change in the state of machining and suppressing the generation of a streak of incision.

The invention claimed is:

1. A wire electrical discharge machine for machining a workpiece by moving a wire electrode relatively to the workpiece and by electrical discharge generated, from a power source unit for machining, between the wire electrode and the workpiece, the wire electrical discharge machine comprising:
a numerical controller configured to
set a wire electrode inclination starting position located anterior to a step portion;
determine whether or not the wire electrode passes the wire electrode inclination starting position;
carry out control of inclining the wire electrode when the numerical controller determined that the wire electrode has passed the wire electrode inclination starting position, wherein said inclining is within the machining plane with respect to a side where the machining plane, formed by relative movement of the wire electrode with respect to the workpiece, crosses the surface of the step portion of the workpiece;
detect a change of a plate thickness in the step portion of the workpiece based on energy supplied from the power source unit for machining;
determine that the wire electrode has passed a position of the step portion when the detected change of the plate thickness exceeds a preset value; and
finish the control of inclining the wire electrode when the numerical controller determines that the wire electrode has passed the position of the step portion.

2. The wire electrical discharge machine according to claim 1, wherein
the energy supplied from the power source unit for machining is represented by a number of pulses of a pulse current supplied from the power source unit for machining, and
the numerical controller is configured to detect the change of the plate thickness based on the number of pulses of the pulse current.

3. The wire electrical discharge machine according to claim 1, wherein the numerical controller is configured to
obtain the energy supplied from the power source unit for machining when the wire electrode moves a predetermined distance after passing the wire electrode inclination starting position, and
detect the change in the plate thickness of the workpiece by comparing the energy thus obtained with a predetermined reference energy.

4. The wire electrical discharge machine according to claim 1, wherein
the energy supplied from the power source unit for machining is represented by a value of integral of a pulse current supplied from the power source unit for machining, and
the numerical controller is configured to detect the change of the plate thickness based on the value of integral of the pulse current.

* * * * *